United States Patent [19]
Roggendorf et al.

[11] Patent Number: 4,697,092
[45] Date of Patent: Sep. 29, 1987

[54] CONTROL SYSTEM FOR ELECTRICALLY OPERATED COMPONENTS OF AN AUTOMOTIVE VEHICLE

[75] Inventors: Peter Roggendorf; Rainer Buchmann, both of Frankfurt, Fed. Rep. of Germany

[73] Assignee: Petri AG, Aschaffenburg, Fed. Rep. of Germany

[21] Appl. No.: 630,935

[22] Filed: Jul. 16, 1984

[51] Int. Cl.⁴ .............................................. H01H 9/00
[52] U.S. Cl. .................................... 307/10 R; 307/9; 200/61.54; 340/52 R
[58] Field of Search .................. 307/10 R, 9; 74/552, 74/558, 484 R, 484 H, 473 SW; 200/61.54, 61.55, 4, 61.56, 61.57, 56 R, 61.35; D12/192, 175; 364/424; 340/22, 572, 573, 52 R

[56] References Cited

U.S. PATENT DOCUMENTS

| | | | |
|---|---|---|---|
| 3,864,578 | 2/1975 | Lackey | 307/10 R |
| 4,306,218 | 12/1981 | Leconte et al. | 364/424 X |
| 4,348,726 | 9/1982 | Igarashi et al. | 364/424 |
| 4,368,454 | 1/1983 | Pilatzki | 74/484 R X |
| 4,386,279 | 5/1983 | Yoshimi et al. | 307/10 R |
| 4,435,648 | 3/1984 | Goode, III | 364/424 X |
| 4,438,425 | 3/1984 | Tsuchida et al. | 307/10 R X |
| 4,442,515 | 4/1984 | Meitzler | 307/10 R X |
| 4,464,933 | 8/1984 | Santis | 74/484 R X |
| 4,471,230 | 9/1984 | Yamamoto | 307/10 R |
| 4,485,371 | 11/1984 | Yamada et al. | 200/61.35 X |
| 4,518,836 | 5/1985 | Wooldridge | 200/61.54 |

FOREIGN PATENT DOCUMENTS

| | | | |
|---|---|---|---|
| 3018247 | 11/1981 | Fed. Rep. of Germany | 74/484 R |
| 0135347 | 10/1981 | Japan | 340/22 |
| 57-87738 | 1/1982 | Japan | |
| 2023938 | 1/1980 | United Kingdom | 200/61.54 |
| 2074313 | 10/1981 | United Kingdom | 307/10 R |

Primary Examiner—William M. Shoop, Jr.
Assistant Examiner—Shik Luen Paul Ip
Attorney, Agent, or Firm—Peter K. Kontler

[57] ABSTRACT

An automotive vehicle has a horn which is mounted on the vehicle chassis. The horn is connected with the vehicle battery by a first conductor. A switch for the horn is mounted on the steering wheel and is connected with the horn via a second conductor. The second conductor is divided into two sections of which one is rotatable with the steering wheel and the other is fixed on the chassis. A control system for controlling electrical components of the vehicle other than the horn has a transmitting unit which is mounted on the steering wheel. The transmitting unit has an output which is connected with the rotatable section of the conductor leading from the horn switch to the horn. The control system further includes a receiving unit which is mounted on the vehicle chassis and has an input connected with the fixed section of this conductor. When the operator of the vehicle presses a switch in order to activate an electrical component, input signals are delivered to the transmitting unit. The transmitting unit codes the input signals, modulates the coded signals onto high frequency carrier signals, and forwards the modulated carrier signals to the receiving unit. The receiving unit, which is connected with the various electrical components, demodulates and decodes the signals arriving from the transmitting unit and then activates the selected electrical component.

7 Claims, 5 Drawing Figures

CONTROL SYSTEM FOR ELECTRICALLY OPERATED COMPONENTS OF AN AUTOMOTIVE VEHICLE

BACKGROUND OF THE INVENTION

The invention relates to a control system for electrically operated components of an automotive vehicle. Examples of such components are the horn, the lights, the fan for the heating and ventilation system, the air conditioning system, electrically powered windshield wipers, electric defroster, power windows, power door locks and power seats.

In a known control system, selector switches or buttons for various electrically operated components are mounted on the steering wheel. The selector switches or buttons for the components other than for the horn are connected with a signal transmitting unit which is likewise mounted on the steering wheel. The transmitting unit receives the signals which are generated by the selector switches or buttons upon activation of the same and transmits the signals to one or more receiving units mounted on a part of the vehicle other than the steering wheel. The receiving unit or units convert the signals sent by the transmitting unit into control signals which are forwarded to the operating elements serving to activate the electrical components. The transmitting unit and the receiving unit or units are connected with one another by a single conductor.

A control system of the type outlined above is disclosed in the West German Offenlegungsschrift 28 47 922. Here, the selector switches or buttons for the electrical components other than the horn are mounted on a pot-shaped cover of the steering wheel. Mounting of the selector switches or buttons on the steering wheel instead of the instrument panel, for example, makes it easier for the operator of the vehicle to observe and activate the selector switches or buttons. The control system of the Offenlegungsschrift also has the advantage that the signals for the different electrical components may be transmitted through a single conductor. This is made possible by the use of a transmitting unit which receives and transmits the signals from the various selector switches or buttons and the use of one or more receiving units which convert these signals into suitable control signals for the operating elements of the electrical components. The signals for the various electrical components are differentiated from one another by employing different pulses for the different electrical components. Since these selector switches or buttons are mounted on the rotatable steering wheel while the corresponding electrical components are mounted on another part of the vehicle, any conductor connecting the selector switches or buttons with the electrical components must be provided with a collector. The control system of the Offenlegungsschrift, in which only a single conductor for the electrical components other than the horn runs between the steering wheel and the body of the vehicle, thus provides considerable simplification as compared to a control system in which each electrical component is connected with the corresponding selector switch or button by an individual lead.

In the control system of the Offenlegungsschrift, a conventional arrangement is used for the horn. A switch or contact for the horn is mounted on the steering wheel while the horn itself, and possibly a relay for the horn, is or are mounted on the body of the vehicle. The switch for the horn is connected with the horn or its relay by a lead provided with a collector.

Although the control system of the Offenlegungsschrift has resulted in substantial simplification, further improvements are desirable.

OBJECTS AND SUMMARY OF THE INVENTION

It is an object of the invention to provide a simplified control system for electrical components of an automotive vehicle.

Another object of the invention is to provide an improved control system for electrical components which may be installed in existing automotive vehicles without major modification of the latter.

An additional object of the invention is to provide a control system of the type outlined above which does not require separate leads and collectors for the horn and other electrically operated components of an automotive vehicle.

The preceding objects, as well as others which will become apparent as the description proceeds, are achieved by the invention.

The invention provides an automotive vehicle which comprises the following:
  (a) an electrically energized emitter for emitting an acoustical warning signal;
  (b) a source of electrical energy for the emitter;
  (c) a switch for activating and deactivating the emitter;
  (d) electrical conductor means connecting the emitter with the electrical energy source and the switch;
  (e) a plurality of electrically operated components additional to the emitter;
  (f) selector means for selecting the additional components to be operated and generating signals representative of the respective additional components;
  (g) electrically energized operating means for operating the additional components in response to the signals generated by the selector means;
  (h) signal processing means interposed between the selector means and the operating means. The processing means includes a first processing unit or transmitting unit having first input means connected with the selector means and first output means connected with the conductor means. The processing means further includes at least one second processing unit or receiving unit having second input means connected with the conductor means and second output means connected with the operating means.

The emitter may be a horn or any other device capable of generating an appropriate acoustical signal. The term horn will be used hereinafter with the understanding that this is not limited to a conventional horn. The horn may be energized in any suitable manner. By way of example, the conductor means connecting the horn with the electrical energy source and the horn switch may include a relay for energizing the horn.

The conductor means connecting the horn with the electrical energy source and the horn switch may include a first conductor which connects the horn with the switch, and a second conductor which connects the horn with the electrical energy source. The electrical energy source may be in the form of a battery which constitutes, or partly constitutes, the main power supply for the vehicle. The second conductor, that is, the conductor connecting the horn with the battery, may then constitute part of the power distribution network of the vehicle.

The horn switch, the selector means and the first processing unit or transmitting unit may all be mounted on the steering wheel of the vehicle. The horn and the second processing unit or receiving unit, on the other hand, may be mounted on the main part of the vehicle relative to which the steering wheel rotates. The main part of the vehicle encompasses the chassis as well as the remainder of the vehicle body. The first conductor, that is, the conductor connecting the horn with the horn switch, here comprises a first section which is connected with the horn switch and is rotatable with the steering wheel, and a second section which is connected with the horn and is fixed. The first and second conductor sections are provided with cooperating collector means designed to permit relative rotation of the first and second sections while maintaining electrical contact between the same. If a relay is provided to energize the horn, the relay may be disposed in the second or fixed conductor section.

The output means of the transmitting unit is connected with the first or rotatable conductor section. The input means of the receiving unit, on the other hand, may be connected either with the second conductor section of the first conductor or with the second conductor leading from the horn to the battery.

The transmitting unit is preferably designed to generate high frequency output signals. Advantageously, the output means of the transmitting unit, as well as the input means of the receiving unit, respectively comprise a coupling element which constitutes a d.c. barrier.

The electrical components of the vehicle which may be selectively activated by the selector means include, but are not limited to, the lights, electrically operated windshield wipers, electric defroster, the fan for the heating and ventilation system, the air conditioning system, power windows, power door locks and power seats.

In a control system according to the invention, the conductor means for the horn is used to transmit signals for other electrical components of the vehicle. This makes it possible to eliminate the separate conductor employed for these signals in the prior art control system described earlier. Since conductor means for the horn are usually present anyway, the use of the conductor means to transmit signals for other electrical components enables simplification to be achieved. In a control system of the type where the selector means for the electrical components is mounted on the steering wheel, elimination of a separate conductor for the electrical components other than the horn results in elimination of a collector also.

By designing the transmitting unit as a high frequency unit, the output signal from the transmitting unit may be readily coupled into the conductor means for the horn. This is possible because the conductor means and the horn, as well as any relay which may be used to energize the horn, have a certain self-inductance. The conductor means may have a fairly substantial self-inductance because the length of the conductor means may be relatively large. For example, the length of the conductor connecting the horn with the horn switch may be of the order of 1.5 meters. The self-inductances of the conductor means, the horn and a horn relay which may be present together constitute a reactance which causes the high frequency output signals from the transmitting unit to undergo a voltage drop. The receiving unit can be designed to generate a high frequency output signal corresponding to that of the transmitting unit.

The use of high frequencies also has the advantage that it is possible to operate with very low currents. As mentioned previously, the horn switch may be mounted on the steering wheel and the conductor connecting the horn with the horn switch is then provided with collector means or a collector. Although the collector may become dirty and then constitute a capacitance, this does not represent a significant barrier to a high frequency current thereby enabling the current to be kept relatively low.

Since the information conveyed by the high frequency signals may be varied by changing the frequency, the frequency modulation, the amplitude modulation, and so on, there is no practical limit to the information which may be fed to the control system via the selector means.

The horn switch may be grounded and the transmitting unit advantageously contains a rechargeable voltage source which is connected in parallel with the grounded horn switch. The voltage source of the transmitting unit can then be charged by current which flows from the vehicle battery through the horn and to the voltage source. The current required to recharge the voltage source is far smaller than that which is necessary to energize the horn. Due to the lower power loss associated with the high frequency signals, a current of five milliamperes in practice suffice to recharge the voltage source. This is approximately 1/100 of the current necessary to energize the horn. By providing the transmitting unit with a rechargeable voltage source, it becomes unnecessary to continuously replace the voltage source. Furthermore, connection of the voltage source in parallel with the horn switch eliminates the need for a special connection between the transmitting unit and the vehicle battery.

In practice, the lower end of the high frequency range is considered to lie in the region of about 10 kilohertz. The transmitting unit is advantageously designed to generate output signals at frequencies between about 40 and 60 kilohertz. Preferably, the output signals generated by the transmitting unit have a frequency of approximately 50 kilohertz. A frequency range of about 40 to 60 kilohertz provides the best transmission results for conventional horns and the conductors and relays conventionally used for horns.

As mentioned previously, the output means of the transmitting unit and the input means of the receiving unit may each include a coupling element which constitutes a d.c. barrier. Advantageously, one or both of these coupling elements is in the form of a capacitive coupling element.

In order to generate high frequency output signals, the transmitting unit may be provided with a source of high frequency carrier signals. The transmitting unit may further be provided with an encoder for converting the signals from the selector means into binary codes. A modulator is disposed in the transmitting unit and is arranged to receive the high frequency carrier signals as well as the binary codes. The modulator serves to incorporate the binary codes into the carrier signals. The receiving unit has a demodulator which is designed to demodulate the modulated signals generated by the modulator. By modulating a high frequency carrier signal with binary codes, it becomes possible to very easily distinguish between the different types of information supplied by the selector means.

The binary codes incorporated in the carrier signals are preferably Bi-phase codes. This increases the reliability of signal transmission.

The transmitting unit may further comprise a sequencer or sequence control mechanism which causes the binary code for any signal generated by the selector means to be repetitively and sequentially incorporated in the carrier signals. For a given signal from the selector means, the corresponding binary code appears in the carrier signals consecutively an arbitrary number of times. The receiving unit has a counter which receives the modulated carrier signals and counts the number of times each binary code is repeated consecutively. The counter prevents energization of any given electrical component until the binary code for the component has been repeated consecutively a predetermined number of times. This arrangement enables a high degree of redundancy to be achieved.

The sequencer is favorably designed to generate a terminal signal when the input of information from the selector means is discontinued. The terminal signal informs the receiving unit that no further information is being transmitted. The receiving unit, in turn, may then terminate the transmission of control signals to the operating means for the electrical components of the vehicle.

It is further of advantage to provide the transmitting unit with a switching device which is capable of switching the transmitting unit between a standby or idle condition and an operating or transmitting condition. The switching device functions to switch the transmitting unit from the standby condition to the operating condition when the selector means begins to forward information, and to switch the transmitting unit back to the standby condition upon termination of the flow of information from the selector means. Switching of the transmitting unit between the standby condition and the operating condition permits energy savings to be realized.

A very simple construction for the transmitting portion of the control unit may be achieved by forming the selector means with an array of switch elements or keys and designing the encoder of the transmitting unit so that a characteristic binary code is assigned to each key. A parallel-serial converter is then interposed between the encoder and the modulator.

Similarly, a very simple construction for the receiving portion of the control unit may be obtained by forming the operating means for the electrical components of the vehicle with a plurality of operating elements each of which corresponds to one of the keys and one of the electrical components. The demodulator of the receiving unit is connected with and delivers the binary codes to a decoder which decodes the binary codes. A serial-parallel converter is interposed between the decoder and the operating elements and functions to direct the control signals generated by the decoder to the appropriate operating elements.

Instead of forming the selector means with a plurality of keys, the selector means may be provided with a receiver which is responsive to radiation. It is preferred for the receiver to be responsive to infrared radiation. The selector means then further comprises a radiation transmitter capable of emitting radiation to which the radiation receiver is sensitive. The radiation transmitter may be designed to generate radiation pulses via which information as to the electrical component or components to be operated may be transmitted to the radiation receiver and, from there, to the transmitting unit. The radiation transmitter may be portable thereby providing the advantage that electrical components of the vehicle may be operated from locations other than the immediate vicinity of the steering wheel. The radiation receiver is advantageously mounted on the steering wheel since it may then be readily reached by the radiation emitted from the radiation transmitter.

The radiation transmitter may be provided with a selecting device or arrangement which is designed to generate a series of binary coded radiation pulses upon activation. This makes it possible to generate either a single command or several commands with the radiation transmitter.

It is favorable to design the steering wheel with a repository for the radiation transmitter. Preferably, the repository is disposed adjacent to the radiation receiver. The repository is designed to removably accommodate the radiation transmitter thereby enabling the latter to be securely held in place on the steering wheel during travel while permitting the radiation transmitter to be freely carried about when desired e.g. when the radiation transmitter is to be used for opening and closing power door locks.

The radiation transmitter may be provided with a rechargeable battery. In such an event, the repository may be provided with two contacts of which one is grounded and the other is connected with the conductor means for the horn. This enables the battery of the radiation transmitter to be charged via the conductor means during travel.

As mentioned above, the operating means for the electrical components of the vehicle may include a plurality of operating elements each of which is associated with one of the electrical components. According to one embodiment of the invention, the signal processing means includes a discrete receiving unit for each operating element. The receiving units are advantageously located adjacent to the respective operating elements. It is preferred for the receiving units to be connected with that conductor which connects the horn with the vehicle battery. As noted earlier, this conductor may constitute part of the main power distribution system for the vehicle. High frequency signals which are capable of being processed by the receiving units may be derived even from the conductor connecting the horn with the vehicle battery. The operating elements in this embodiment may be directly connected to the main power distribution system of the vehicle. This makes it possible to dispense with special control lines.

As mentioned previously, the transmitting unit may be provided with a rechargeable voltage source. This voltage source advantageously includes a diode circuit designed as a d.c. barrier. This makes it possible to prevent a high frequency short circuit in the capacitor or capacitors which will generally be present in the rechargeable voltage source.

The transmitting unit may be in the form of a module which is designed to be mounted on the steering wheel. The module is provided with a ground connection as well as a connection for that section of the horn conductor means which rotates with the steering wheel. The transmitting module may be built into the steering wheel as an additional part thereof or may be substituted for an existing part of the steering wheel. Installation of the transmitting module in the steering wheel requires only minimal modifications in the normal steering wheel design.

The selector means may likewise be in the form of one or more modules which are designed to be mounted on the steering wheel. The selector module or modules may be constructed to be mounted on the steering wheel independently of the transmitting module and to be connected with the latter by means of suitable leads. In such a case, it is usually possible to install the transmitting and selector modules on existing steering wheels retroactively.

The novel features which are considered as characteristic of the invention are set forth in particular in the appended claims. The improved control system itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
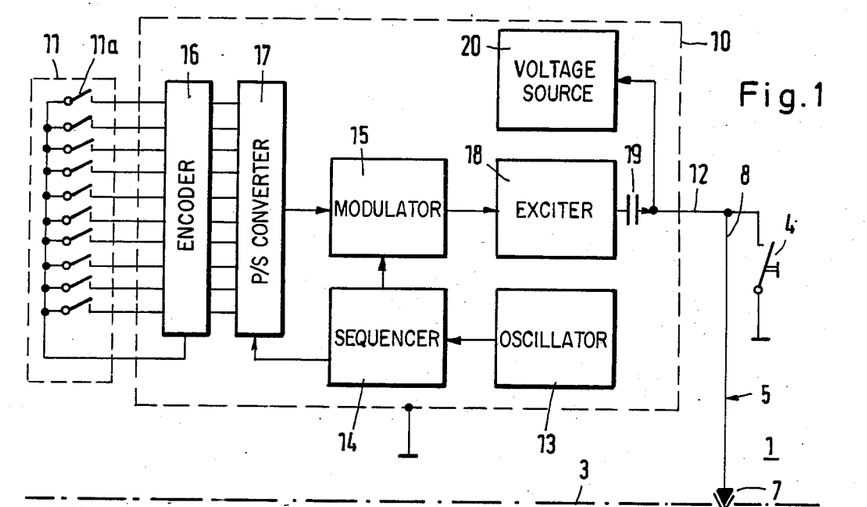
FIG. 1 is a block diagram of one embodiment of a control system according to the invention.

Referring to FIG. 1, the reference numeral 1 identifies the steering wheel of an automotive vehicle, e.g. an automobile, while the reference numeral 2 identifies the body of the vehicle. The body 2 encompasses all parts of the vehicle except for the steering wheel 1 and thus includes the chassis of the vehicle as well as all electrically operated components of the vehicle which are mounted on the chassis. The steering wheel 1 rotates relative to the body 2 and this is schematically indicated by a dash-and-dot line 3 separating the steering wheel 1 and the body 2.

A horn 6 is mounted on the body 2. As indicated earlier, the term horn includes any emitter capable of emitting an acoustical warning signal for other automotive vehicles and pedestrians. The horn 6 is connected to a battery forming part of or constituting the main power supply of the vehicle. This battery, which may be referred to as the vehicle battery, is identified by the reference character U which represents the voltage generated thereby. The horn 6 is further connected to a horn switch or contact 4 which is mounted on the steering wheel 1. The switch 4 is grounded. The horn 6 and the switch 4 are connected by a conductor 5 having a section 9 which is fixed on the body 2 and a section 8 which is mounted on and is rotatable with the steering wheel 1. The conductor 5 is provided with a collector 7 at the boundary 3 between the steering wheel 1 and the body 2, that is, the conductor sections 8 and 9 are formed with cooperating collector means or elements.

The vehicle battery U, which constitutes a source of electrical energy for the horn 6, is connected with the horn 6 by a conductor 63. The conductors 5 and 63 together constitute electrical conductor means connecting the horn 6 with the vehicle battery U and the horn switch 4.

A first processing unit or transmitting unit 10 is mounted on the steering wheel 1. Also mounted on the steering wheel 1 is a selector panel or selector means 11 having an array of switch elements or keys 11a. The keys 11a may be manipulated by an operator of the vehicle and each of the keys 11a controls a respective electrical component of the vehicle. Actuation of a key 11a causes the corresponding electrical component of the vehicle to operate. The transmitting unit 10 has input means in the form of a series of inputs which are respectively connected with the keys 11a. When a key 11a is actuated, a signal is sent to the transmitting unit 10.

The transmitting unit 10 has an output or output means 12. The output 12 is connected with the section 8 of the conductor 5, that is, the section of the conductor 5 which is connected with the horn switch 4 and rotates with the steering wheel 1.

The transmitting unit 10 includes a high frequency oscillator 13. The oscillator 13 preferably operates at frequencies in the range of about 40 to 60 kHz and advantageously operates at a frequency of about 50 kHz. The transmitting unit 10 further includes a modulator 15 as well as a sequencer or sequence control mechanism 14 having an input connected with the oscillator 13 and an output leading to the modulator 15. The sequencer 14 has a second output which is connected with a parallel-serial or P/S converter 17 also constituting part of the transmitting unit 10. The parallel-serial converter 17 has an output leading to the modulator 15. An encoder 16, which likewise forms part of the transmitting unit 10, is disposed between the parallel-serial converter 17 and the selector panel 11. The inputs of the transmitting unit 10 enter the encoder 16 and the latter has a series of outputs each of which corresponds to one of the inputs of the transmitting unit 10 and leads to the parallel-serial converter 17.

The encoder 16 assigns a binary code to each of the keys 11a of the selector panel 11. The binary code issued by the encoder 16 in response to actuation of a key 11a is converted into a series of pulses in the parallel-serial converter 17. These pulses are transmitted to the modulator 15 where they modulate the high frequency carrier signal generated by the oscillator 13 and forwarded to the modulator 15 via the sequencer 14. The modulator 15 issues a modulated high frequency signal which is preferably a Bi-phase code modulated signal. The modulated high frequency signal is sent to a driver or exciter 18 where it is amplified. The driver 18 constitutes part of the transmitting unit 10. The amplified signal derived from the driver 18 is coupled into the section 8 of the conductor 5 via a coupling capacitor 19 which also forms part of the transmitting unit 10. The coupling capacitor 19 serves as a capacititive d.c. barrier.

The transmitting unit 10 further comprises a voltage source 20 which is connected with the output 12 of the transmitting unit 10 and is arranged in parallel with the horn switch 4. The voltage source 20 has a voltage stabilizing circuit which receives current from the vehicle battery U via the conductor 5. The voltage stabilizing circuit is equipped with capacitors in a conventional manner. In order to prevent short circuits, which may weaken the high frequency signals, from occurring across the capacitors, the voltage source 20 is further provided with a pair of diodes or a diode circuit designed to function as a d.c. barrier.

The current supplied to the voltage source 20 may be much smaller than that required to operate the horn 6. For example, the voltage source 20 may operate with a current which is approximately 1/100 of that required to activate the horn 6.

A second signal processing unit or receiving unit 21 is mounted on the vehicle body 2. The receiving unit 21 has an input or input means 22 which receives the modulated and amplified high frequency signals from the transmitting unit 10. The input 22 of the receiving unit 21 is connected with the section 9 of the conductor 5, that is, the section of the conductor 5 which is fixed on the vehicle body 2 and is connected with the horn 6.

The receiving unit 21 controls operating means which function to operate various electrical components of the vehicle. By way of example, FIG. 1 shows that the operating means may serve to switch the headlights of the vehicle on and off. In addition to operating electrical components such as the headlights, the operating means may serve to activate and deactivate electrical instruments which perform measurements and/or function as indicators. As an example of such an electrical instrument, FIG. 1 illustrates an oil pressure gauge. The operating means includes a series of operating elements which are here in the form of relays 23 connected to the vehicle battery U. Each of the keys 11a of the selector panel 11 has a corresponding relay 23 which is activated when the respective key 11a is manipulated by an operator of the vehicle. The receiving unit 21 has a series of outputs 32 which are connected with respective ones of the relays 23. The outputs 32 together constitute output means of the receiving unit 21.

The receiving unit 21 includes an oscillator 24 which, like the oscillator 13 of the transmitting unit 10, is operated at frequencies in the range of about 40 to 60 kHz. Advantageously, the oscillator 24 is operated at a frequency of approximately 50 kHz. The oscillator 24 has an output which is connected with a sequencer or sequence control mechanism 25 also constituting part of the receiving unit 21. The sequencer 25 has a first output which leads to a signal detector or counter 29 likewise forming part of the receiving unit 21. The sequencer 25 further has a second output which is connected with a demodulator and decoder 26. The demodulator and decoder 26 likewise constitutes part of the receiving unit 21.

The modulated and amplified high frequency signals delivered by the transmitting unit 10 to the input 22 of the receiving unit 21 pass through a coupling capacitor 27 and then enter a bandpass amplifier 28. The bandpass amplifier 28 is designed as a wide-band amplifier. The coupling capacitor 27 constitutes a capacitive d.c. barrier. Both the coupling capacitor 27 and the bandpass amplifier 28 form part of the receiving unit 21.

The bandpass amplifier 28 has an output which is connected with the demodulator and decoder 26. The high frequency output signals from the transmitting unit 10 are demodulated and decoded in the demodulator and decoder 26. The demodulated and decoded signals are sent to the counter 29 which counts the number of times that the same binary code is repeated consecutively. From the counter 29, the demodulated and decoded signals are forwarded to a serial-parallel or S/P converter 30 which again forms part of the receiving unit 21. The serial-parallel converter 30 converts the demodulated and decoded signals into control signals and assigns the signals derived from each key 11a to the appropriate output 32 of the receiving unit 21, and hence to the relay 23 corresponding to the respective key 11a. A driver or exciter 31, which also constitutes part of the receiving unit 21, is interposed between the serial-parallel converter 30 and the outputs 32.

The receiving unit 21 further has a voltage source 33 which is identical to the voltage source 20 of the transmitting unit 10. The voltage source 33 is connected with the input 22 of the receiving unit 21.

The transmitting unit 10 and receiving unit 21 together constitute signal processing means.

The control system of FIG. 1 operates as follows:

The keys 11a of the selector panel 11 are continuously monitored to determine whether one or more of the keys 11a has been activated. A switching device is provided for the transmitting unit 10 and functions to switch the transmitting unit 10 between a standby condition and a transmitting condition. The transmitting unit 10 is in the standby condition as long as none of the keys 11a is activated. When a key 11a is activated or depressed, the transmitting unit 10 switches from the standby condition to the transmitting condition. The signals delivered to the transmitting unit 10 by the activated key 11a are converted into a binary code by the encoder 16. The binary code is transferred to the modulator 15 where it is modulated onto or incorporated in the high frequency carrier signal issued by the oscillator 13. The binary code is modulated onto the high frequency carrier signal as a Bi-phase code.

The sequencer 14 causes the binary code to be repeated at intervals, e.g. every 40 milliseconds, while the key 11a is activated. As a result, the binary code is repetitively modulated onto the carrier signal so that the same binary code appears consecutively two or more times in the modulated carrier signal. When the activated key 11a is released, the sequencer 14 causes a terminal signal to be generated. The terminal signal informs the receiving unit 21 that no further information is being transmitted.

A voltage drop for the high frequency output signals of the transmitting unit 10 is generated due to the self-inductance of the conductor 5 and the horn 6. The amplitudes of the signals may lie in the range of about 0.3 to 0.7 volt.

A substantial amount of background noise is generated by stray voltages from external sources, e.g. ignition sparks and electric motors. For this reason, the high frequency signals coming from the transmitting unit 10 are capacitively decoupled from the conductor 5 in the receiving unit 21 by means of the coupling capacitor 27 and then sent to the regulated wide-band amplifier 28. The wide-band amplifier 28 is capable of selectively amplifying signals having amplitudes as small as 0.5 millivolt.

The high frequency signal is transmitted from the bandpass amplifier 28 to the demodulator and decoder 26. In the demodulator and decoder 26, a rectangular signal is derived from the high frequency signal. The rectangular signal represents the Bi-phase code sent from the transmitting unit 10 to the receiving unit 21. The rectangular signal enters the counter 29 which counts the number of times that the same binary code appears consecutively. The information represented by a particular binary code is forwarded to the serial-parallel converter 30 only if the binary code occurs consecutively a predetermined number of times, e.g. only if the binary code is repeated consecutively three times. When this happens, the information represented by the binary code is forwarded to the serial-parallel converter 30 and then, via the driver 31, to the relay 23 which corresponds to the activated key 11a.

All types of electrically operated components of an automotive vehicle may be controlled using a control system in accordance with the invention. By way of example, the relays 23 may operate headlights, electric power windows, electric door locks, electric windshield wipers, electric defrosters, electric power seats, ventilating and air conditioning systems, and so on. Moreover, in addition to components of the type just listed, the control system of the invention may be used to control measuring and/or indicating instruments, e.g. oil pressure gauges and temperature gauges, which perform a measurement and/or provide a reading when appropriate input signals are supplied to the transmitting unit 10.

Figure 2:
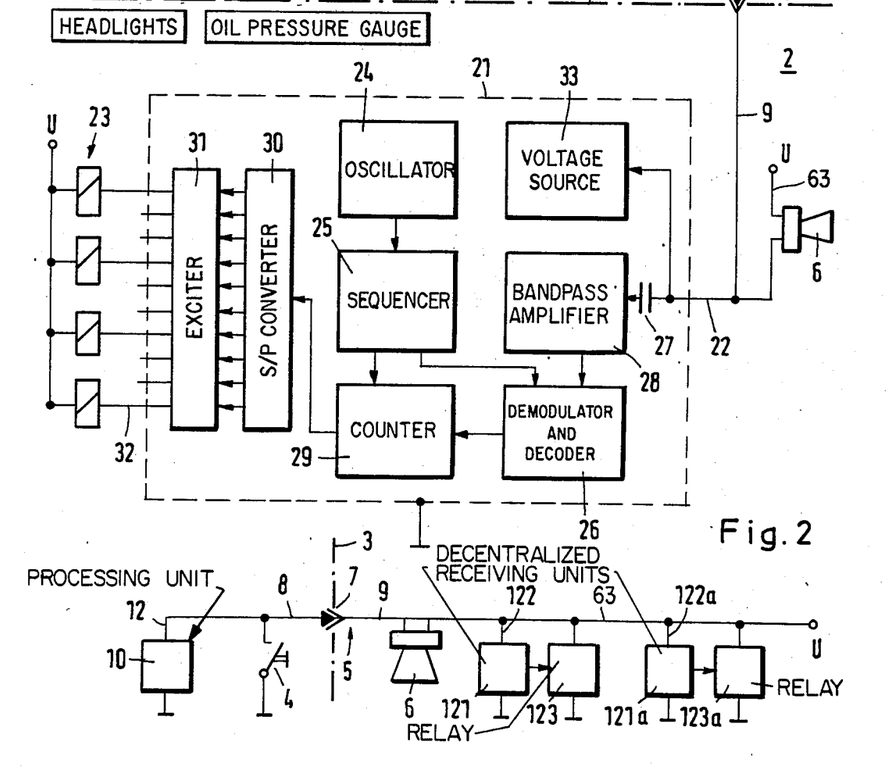
FIG. 2 is a block diagram of another embodiment of a control system in accordance with the invention.

Referring to FIG. 2, the same reference numerals as in FIG. 1 are used to identify identical elements. The horn switch 4, conductor 5 and horn 6 in FIG. 2 are arranged in the same manner as in FIG. 1. Likewise, the output 12 of the transmitting unit 10 is again connected with the section 8 of the conductor 5, that is, the section of the conductor 5 which is connected with the horn switch 4 and is rotatable with the steering wheel 1.

In FIG. 2, however, the central receiving unit 21 of FIG. 1 is replaced by a plurality of decentralized receiving units. Two such receiving units are shown and are identified by the reference numerals 121 and 121a. The receiving unit 121 controls a relay 123 which, in turn, operates one of the electrical components of the vehicle. The receiving unit 121 is located adjacent to the corresponding relay 123 and the associated electrical component of the vehicle. Similarly, the receiving unit 121a controls an individual relay 123a which, in turn, operates a respective electrical component of the vehicle. Again, the receiving unit 121a is disposed adjacent to the corresponding relay 123a and the associated electrical component of the vehicle.

The receiving unit 121 has an input 122 while the receiving unit 121a has an input 122a. In contrast to the embodiment of FIG. 1, the inputs 122 and 122a are connected to the conductor 63 which leads to the vehicle battery U and constitutes part of the main power supply network of the vehicle. The high frequency signals are somewhat weaker in the conductor 63 than in the section 9 of the conductor 5. This does not significantly affect the operation of the control system since the receiving units 121, 121a may be readily designed with a selectivity and amplification which permit the control information sent by the transmitting unit 10 to be received correctly. Each of the receiving units 121, 121a transmits a control signal to the respective relay 123, 123a only when it receives coded information derived from the associated key 11a.

Figure 3:
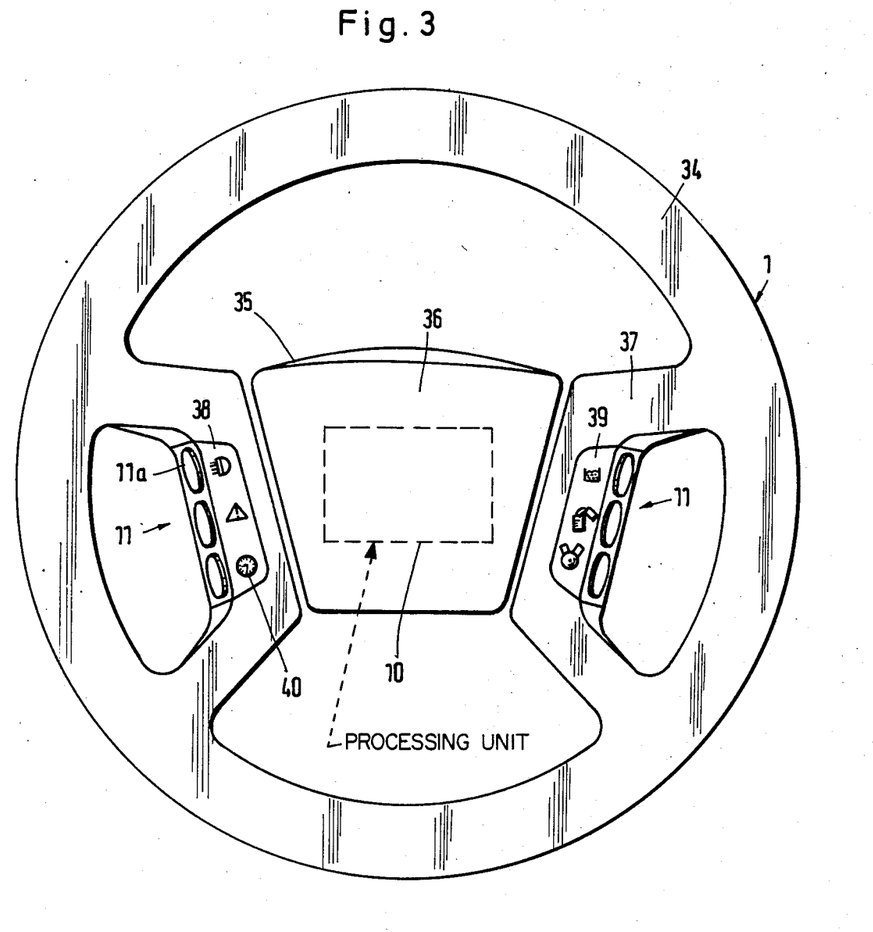
FIG. 3 is a plan view of an automotive steering wheel equipped with a transmitting unit and selector means constituting part of a control system according to the invention.

FIG. 3 illustrates the steering wheel 1 pictorially. The steering wheel 1 has a rim 34 as well as a hub 35 and connecting spokes 37. The hub 35 accomodates the transmitting unit 10 and is provided with a plate or cover 36 which serves to operate the horn switch 4.

The selector panel 11 is here shown as comprising a pair of housings 38 and 39. Each of the housings 38, 39 receives three keys 11a. The keys 11a of FIG. 3 are designed to be operated as push buttons. A symbol 40 is associated with each key 11a and identifies the function performed by the respective key 11a.

Figure 4:
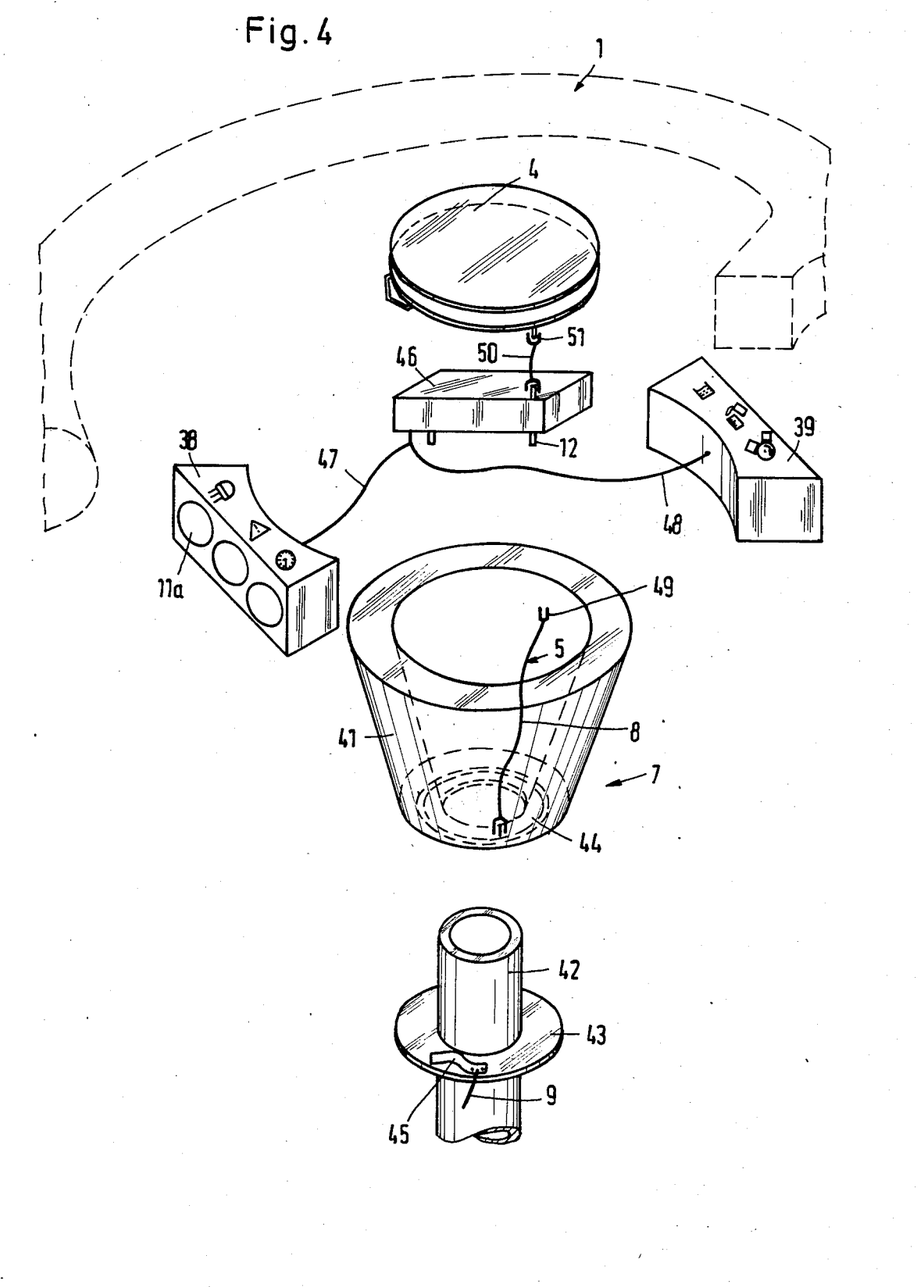
FIG. 4 is an exploded view showing certain of the parts included in the steering wheel of FIG. 3.

FIG. 4 is an exploded view of the steering wheel 1 of FIG. 3. The steering wheel 1 is connected with a hub 41 which sits on a steering column 42. The steering column 42, in turn, is mounted in a bearing 43.

A collector ring 44 constituting part of the collector 7 is formed at the lower end of the hub 41. A wiper or contact 45, which also forms part of the collector 7, is mounted on the bearing 43 and is arranged to cooperate with the collector ring 44. The collector ring 44 is connected with the section 8 of the conductor 5 which is rotatable with the steering wheel 1. The contact 45, on the other hand, is connected with the section 9 of the conductor 5 which is fixed on the vehicle body 2.

A processing module 46 is disposed below the horn switch 4 in the region of the hub 41. The processing module 46 contains the transmitting unit 10. The processing module 46 is connected with the housings 38, 39 of the selector panel 11 via respective leads or conductors 47 and 48. Each of the housings 38, 39 together with the associated keys 11a may be considered to constitute a selector module. The processing module 46 and the selector modules 38, 11a and 39, 11a may be readily installed in existing vehicles retroactively. The selector modules 38, 11a and 39, 11a are designed to be installed in a vehicle independently of the processing module 46.

The output 12 of the transmitting unit 10 is in the form of a pin which extends from one side of the processing module 46 to the other. The section 8 of the conductor 5 is provided with a connector 49 which may be engaged with one end of the pin constituting the output 12 of the transmitting unit 10. The other end of the pin forming the output 12 of the transmitting unit 10 is engaged by a short lead 50 which is connected with a contact 51 of the horn switch 4.

Figure 5:
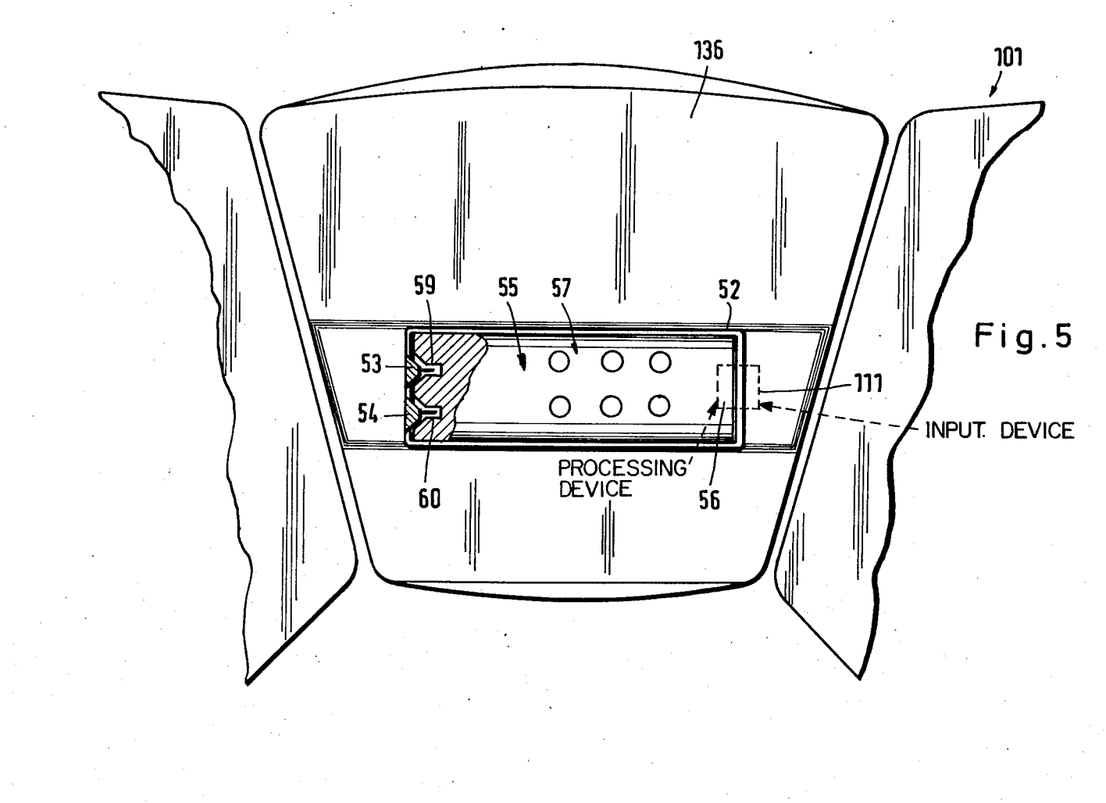
FIG. 5 is a partly sectional, broken away plan view of a steering wheel with a different embodiment of selector means.

FIG. 5 illustrates a steering wheel 101 having a fixed central plate 136. The plate 136 is provided with a repository 52 in the form of a recess. An input device 111 is located at one wall of the recess 52. A pair of charging contacts in the form of plugs 53 and 54 is disposed at the opposite side of the recess 52. One of the plugs 53, 54 is connected with the output 12 of the transmitting unit 10 while the other is grounded.

The input device 111 constitutes part of a selector means for selecting an electrical component of the vehicle to be operated and supplies input signals representative of a component to be operated to the transmitting unit 10. The input device 111 is in the form of a receiver responsive to infrared radiation. The selector means comprising the input device 111 further includes a radiation transmitter which is generally identified by the reference numeral 55. The radiation transmitter 55 has a transmitting device 56 capable of emitting infrared radiation. The transmitting device 56 enables control information for electrical components to be activated to be transmitted to the input device 111 in the form of infrared radiation pulses. The radiation transmitter 55 is further provided with a selector device 57 or panel which may, for example, be equipped with contactless sensors or buttons. With the aid of the selector device 57, specific control information may be selected and sent to the transmitting unit 10 via the radiation transmitting device 56 and the radiation-responsive receiver 111.

The radiation transmitter 55 has a rechargeable battery. A pair of sockets 59 and 60 is formed in the radiation transmitter 55, and the sockets 59, 60 are designed to receive the respective plugs 53, 54 when the radiation transmitter 55 is disposed in the recess 52. The plugs 53, 54 and 59-60 enable the battery of the radiation transmitter 55 to be charged during operation of the vehicle.

The radiation transmitter 55 is capable of activating the receiver 111 regardless of whether the radiation transmitter 55 is accommodated in the recess 52 or has been removed therefrom. It is even possible for the radiation transmitter 55 to activate the receiver 111 when the radiation transmitter 55 is located outside of the vehicle. This may be of particular advantage if the vehicle is equipped with power door locks since the radiation transmitter 55 may then be used to unlock the doors.

All elements in the drawings which are provided with the ground symbol are at ground potential. Grounding may be accomplished by means of a special conductor or by mechanical contact between electrically conductive elements.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An automotive vehicle comprising a vehicle body having a chassis; a steering wheel mounted on said vehicle body for rotation relative thereto; an electrically energized emitter arrangement for emitting an acoustical warning signal mounted on said vehicle body; a source of electrical energy for said emitter arrangement mounted on said vehicle body; a switch for activating and deactivating said emitter arrangement mounted on said steering wheel; electrical conductor means connecting said emitter arrangement with said source and said switch, said conductor means including a first conductor which connects said emitter arrangement with said switch and a second conductor which connects said emitter arrangement with said source, and said first conductor having a first section which is connected with said switch and is rotatable with said steering wheel and a second section which is connected with said emitter arrangement and is fixed, said first and second sections being provided with cooperating collector means designed to permit relative rotation of said first and second sections; at least one electrically operated component additional to said emitter arrangement and mounted on said vehicle body; selector means for selecting the additional component to be operated and generating signals representative of the additional component mounted on said steering wheel; electrically energized operating means for operating said additional component in response to the signals generated by said selector means mounted on said vehicle body; and signal processing means interposed between said selector means and said operating means, said processing means including a first signal processing unit mounted on said steering wheel, and said first processing unit having first input means connected with said selector means, a source of carrier signals, an encoder for converting the signals from said selector means into binary codes, a modulator for modulating the the carrier signals so that the latter incorporate the binary code and first output means connected with said first section of said first conductor, said processing means further including at least one second signal processing unit mounted on said vehicle body and said second processing units having a demodulator for demodulating the signals generated by said modulator, second output means connected with said operating means and second input means connected with said second section of said first conductor, said first processing unit being designed to generate high frequency output signals and each of said first output means and said second input means having a coupling element which constitutes a d.c. barrier.

2. The vehicle of claim 1, wherein said first processing unit is designed to generate output signals in a frequency range of about 40 to 60 kHz.

3. The vehicle of claim 2, wherein said first processing unit is designed to generate output signals at a frequency of approximately 50 kHz.

4. The vehicle of claim 1, wherein said encoder is designed to generate Bi-phase codes.

5. The vehicle of claim 1, wherein said first processing unit further comprises a switching device for switching said first processing unit between a standby condition and an operating condition.

6. The vehicle of claim 1, said selector means comprising a plurality of switch elements and said encoder having means for assigning a binary code to each of said switch elements and said modulator having means for modulating the carrier signals so that the latter incorporate the binary codes, said first processing unit further comprising a parallel-serial converter interposed between said encoder and said modulator.

7. The vehicle of claim 6, said operating means comprising a plurality of operating elements; and wherein said second processing unit further comprises a serial-parallel converter interposed between said decoder and said operating elements.

* * * * *